No. 757,948.

Patented April 19, 1904.

UNITED STATES PATENT OFFICE.

ARMAND MÜLLER-JACOBS, OF RICHMOND HILL, NEW YORK, ASSIGNOR TO COSMOS CHEMICAL COMPANY, A CORPORATION OF NEW YORK.

SIZING.

SPECIFICATION forming part of Letters Patent No. 757,948, dated April 19, 1904.

Application filed July 2, 1903. Serial No. 164,003. (No specimens.)

*To all whom it may concern:*

Be it known that I, ARMAND MÜLLER-JACOBS, a citizen of the Swiss Republic, and a resident of Richmond Hill, county of Queens, and State of New York, have invented certain new and useful Improvements in Sizing, of which the following is a specification.

This invention relates to improvements in sizings and finishing materials for paper, cotton, silk, wool, leather, and other material of fibrous nature.

I have found that the amids of stearic acids or similar fatty acids and their derivatives, such as methylated and ethylated amids, while not soluble in cold or warm water, can be made into an extremely fine emulsion or suspension with soap solutions and kept in this condition for any length of time. I also find that stear-amid or its analogues can easily be worked into warm solutions made of starch, glue, or casein, which, as well as soap solutions, form soluble magmas having the property to keep the amid in a finely-divided discrete and insoluble state and can be diluted to any extent with water without separation of the amid, thus forming sizings that being applied to fibrous bodies render them soft and pliable, adding body, weight, and gloss to them and giving them more durability, according to the strength of the solution used. Another valuable property of this sizing is that it cannot be washed out by cold water. The special properties of the stear-amid, as stated farther on, make this chemical substance most valuable for various industrial purposes, principally those already mentioned in this application. In its pure state the stear-amid forms, according to the method of its manufacture, either a snow-white light amorphous powder or a product of fine crystalline scales and high silky gloss and is insoluble in cold or boiling water and only sparingly soluble in cold alcohol, ether, benzol, benzin, chloroform, or similar solvents, but is readily soluble in such solvents when heated. Its melting temperature is between 108° and 109° centigrade. It resists chemical action of not too strong solutions of alkalies, as well as of mineral or of organic acids. The soap or glue solutions in which a proper quantity of stear-amid is suspended are of thin consistency when warm, but become thicker and smooth when cooled down and can thus be utilized in either condition for the purposes mentioned.

In carrying out my invention I proceed as follows: I add to an ordinary soap solution, when boiling, its equal quantity of the stear-amid or more or less, as the nature of the article under treatment may require. The stear-amid will melt in the solution under constant agitation, thus becoming converted into a finely-divided and discrete state, especially when the solution gradually cools down. Glue and casein solutions are similarly prepared. Cotton, silk, or woolen goods, felt, leather, paper, &c., are impregnated and treated in a way as each article may require under given conditions. They are used separately or together, as the case may be, as the vehicle for the suspension of the stear-amid. I add, for instance, my amid emulsion directly to the paper-pulp, in combination with or without the ordinary sizings, or I pass the ready-made paper through the above-described amid solution, thus obtaining after finishing much more gloss, impermeability against water, and durability. By the first method the soap contained in the amid liquor is converted into the corresponding alum compound, thus adding to the lining of the paper; but of course I do not claim the formation of stearate of alumina as essential or new in connection with this process.

In treating cotton or silk goods with the amid solution I may afterward also pass the fabric through an alum-bath of appropriate concentration, thus forming an insoluble aluminium salt which, in combination with the amid, renders the goods waterproof; but in this process also it is only the presence of the stear-amid that is new in goods manufactured in this way.

Another stear-amid sizing compound, consisting of stear-amid and starch and containing five per cent. or more stear-amid, when used for laundry purposes will give clothing a high gloss when ironed and is preferable to wax or paraffin or stearic acid, which are now used.

What I claim as my invention is—

1. A sizing for fibrous substances consisting of an amid of the higher fatty acids in an emulsion comprising a suitable carrying or suspending body therefor.

2. A sizing for fibrous substances consisting of an amid of the higher fatty acids in a soluble magma having the property of keeping the amid in a finely-divided, discrete and insoluble state.

Signed at New York this 27th day of June, 1903.

ARMAND MÜLLER-JACOBS.

Witnesses:
A. P. THAYER,
J. M. HOWARD.